United States Patent [19]

Pannier et al.

[11] Patent Number: 4,476,530
[45] Date of Patent: Oct. 9, 1984

[54] MICROCOMPUTER ELECTRONIC CONTROL SYSTEM FOR AUTOMATIC TRANSMISSION OF MOTOR VEHICLE

[75] Inventors: Gerard Pannier, Bois d'Arcy; Jean C. Roumy, Meudon, both of France

[73] Assignee: Regie Nationale des Usines Renault, Boulogne-Billancourt, France

[21] Appl. No.: 248,235

[22] Filed: Mar. 27, 1981

[30] Foreign Application Priority Data

Apr. 3, 1980 [FR] France ................ 80 07584

[51] Int. Cl.³ .................. B60K 41/18; G06J 3/00
[52] U.S. Cl. .................. 364/424.1; 74/866; 371/66
[58] Field of Search .............. 364/424.1; 74/866; 371/66

[56] References Cited

U.S. PATENT DOCUMENTS

| 4,034,627 | 7/1977 | Mizote | 74/866 |
| 4,282,574 | 8/1981 | Yoshida et al. | 371/66 X |
| 4,282,780 | 8/1981 | Totani et al. | 74/866 |
| 4,295,551 | 10/1981 | Zimmermann et al. | 74/866 |
| 4,324,153 | 4/1982 | Sugimoto et al. | 74/866 |
| 4,351,205 | 9/1982 | Fischer | 74/866 |

FOREIGN PATENT DOCUMENTS

| 1032081 | 6/1966 | United Kingdom | 371/66 |
| 721818 | 3/1980 | U.S.S.R. | 371/66 |

Primary Examiner—Felix D. Gruber
Attorney, Agent, or Firm—Owen, Wickersham & Erickson

[57] ABSTRACT

An electronic system for controlling the drive ratio changes in an automatic transmission of a motor vehicle having solenoid valves for actuating the gear changes. A microcomputer selectively governs the solenoid valves through power amplifiers, in such a way that when the solenoid valves are not energized the highest drive ratio is engaged. The ratio of the power amplifiers to the corresponding output signals of the microcomputer is such that the solenoid valves are not energized when the supply voltage is zero or when the microcomputer voltage drops below the threshold value necessary for its proper operation.

13 Claims, 4 Drawing Figures

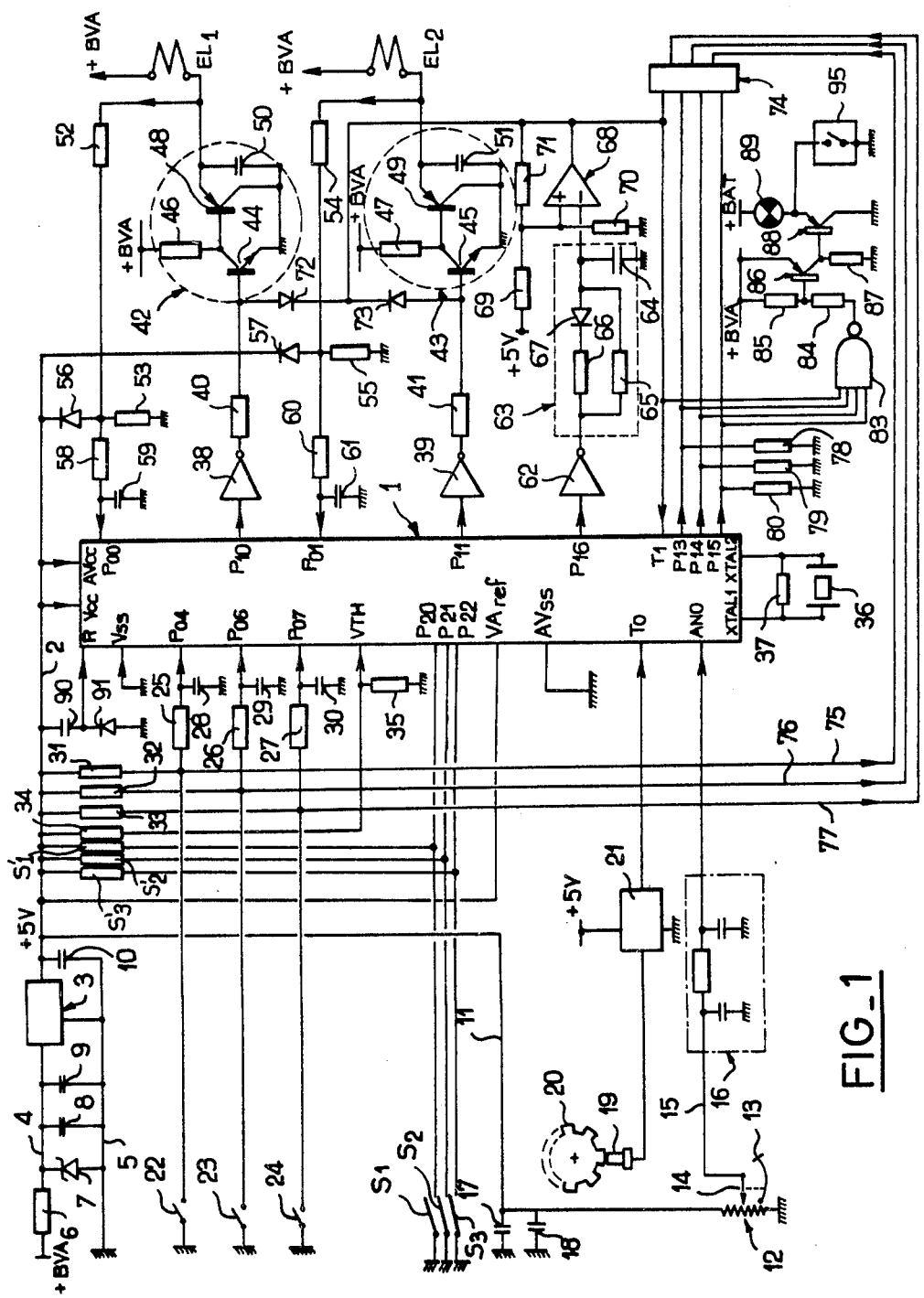
FIG_1

|  | 1ère | 2ème | 3ème |
|---|---|---|---|
| $P_{10}$ | 0 | 0 | 1 |
| $P_{11}$ | 1 | 0 | 1 |
|  | $EL_1$ | $EL_1$-$EL_2$ |  |
FIG_2
|  | $T_1$ | $P_{13}$ | $P_{14}$ | $P_{15}$ |
|---|---|---|---|---|
|  | 1 | 1 | 1 | 1 |
|  | 0 | 0 | 0 | 0 |
|  | 1 | 0 | 1 | 1 |
|  | 0 | x | x | x |
|  | 1 | 1 | 0 | 1 |
|  | 1 | 1 | 1 | 0 |
FIG_3
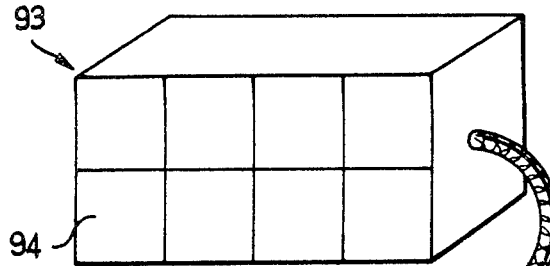
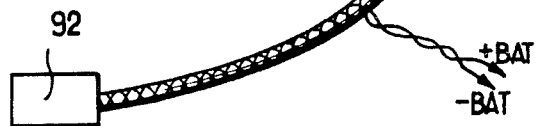
FIG_4

MICROCOMPUTER ELECTRONIC CONTROL SYSTEM FOR AUTOMATIC TRANSMISSION OF MOTOR VEHICLE

BACKGROUND OF THE INVENTION

The present invention relates to an electronic system for controlling the change of drive ratio in an automatic transmission of a motor vehicle comprising gear-changed solenoid valves responsive to the electronic control system.

SUMMARY OF THE INVENTION

This invention is directed to a combination including a microcomputer which, as a function of data resulting from the vehicle operation, selectively regulates the energization of the gear-change solenoid valves through power amplifiers and reduces considerably the number of discrete component elements and consequently the cost of the system in comparison with electronic control systems without a microcomputer. At the same time it provides an extremely flexible adaptation of the control system to the specific characteristics of different types of vehicles and also to the users' requirements (for example in connection with fuel savings and better performances).

This invention contemplates more particularly a novel arrangement of a control system of the type broadly defined hereinabove which is intended notably for avoiding the inconveniences likely to result from its faulty operation, such as the consequences of the implementation of a microcomputer and/or of the satellite components associated therewith, especially in so far as the passengers' safety and the lasting mechanical efficiency of the power unit and transmission assembly are concerned.

For this purpose, the electronic control system according to the present invention is characterized basically by its incorporation of a microcomputer governing selectively the energization of the gear-change solenoid valves through power amplifiers, so that when the solenoid valves are de-energized the highest drive ratio of the transmission is engaged. The relationship of the power amplifiers to the corresponding microcomputer outputs is such that the solenoid valves are de-energized when the feed voltage is zero or when the microcomputer feed voltage drops below the value necessary for its proper operation. This is done by actuating its reinitialization or resetting pin.

Preferably, this electronic control system further comprises for each solenoid valve a circuit for controlling the voltage supplied thereto. This valve control circuit is branched off one of the microcomputer inputs in order to compare the logic coincidence of the solenoid valve supply output signal with the signal from the control circuit.

Also preferably, the electronic control system of this invention comprises a circuit for supervising a periodic signal output representative of the correct operation of the computer. This circuit incorporates voltage integration and comparison means so that the output thereof can assume two different logic states according to whether the periodic signal is regular or not. The output of this supervision circuit is coupled to one point of each solenoid valve supply control circuit intermediate the relevant output of the microcomputer and the corresponding amplifier, so that its faulty logic state implies an amplifier state corresponding to the non-energization of each solenoid valve.

On the other hand, the microcomputer is internally programmed to check the peripheral component elements and more particularly the engine load sensor and the vehicle speed sensor.

Along the same lines aiming at an improved safety the present invention includes warning the driver in case of any detected abnormal condition or faulty operation, and transmitting the identification data thereof to a diagnosis outlet provided on board the vehicle for use by the after-sale trouble-shooting network.

The above-described and other features characterising the present invention will be better understood when reading the following description of a typical form of embodiment of the electronic control system according to this invention, given by way of example with reference to the accompanying drawings.

THE DRAWINGS

FIG. 1 is a wiring diagram of the electronic circuit constituting the control system of this invention;

FIG. 2 is a table illustrating the logic states of two outputs of the microcomputer which govern the energization of the solenoid valves and the forward drive ratios;

FIG. 3 is another table showing the conditions of the various outputs of the microcomputer in response to the various detected states of the control system, and FIG. 4 is a diagrammatic view of a control box for connection to the diagnosis outlet and also to the storage battery of the vehicle.

DESCRIPTION OF THE PREFERRED EMBODIMENT

The electronic control system illustrated in FIG. 1 is arranged about a microcomputer designated in general by the reference numeral 1. This microcomputer, preferably of the Type 8022 manufactured by INTEL, is advantageous notably in that it incorporates an A/D converter particularly convenient for taking due account of the input parameter comprising the engine load factor applied thereto, for example in the form of a potentiometric voltage representative of the degree of depression of the accelerator pedal by the driver. By way of information, it is known in the art to seal a microcomputer of this type in a forty-pin case, this microcomputer being adapted to integrate notably 64 octets in a RAM (Random Access Memory) and 2,048 octets in a ROM (Read Only Memory). It comprises twenty-eight input-output lines of which two are analog inputs and two are outputs each capable of delivering in the high state a 7 mA current, in this case for controlling the solenoid valves by means of semi-conductor type amplifiers. This microcomputer, operating at a voltage within the range of 4.5 to 6.5 V, is capable of executing more than seventy instructions and incorporates an internal counter together with a clock and its oscillator.

This microcomputer 1 receives at its Vcc input and also at its AVcc input corresponding to the supply input for the internal A/D converter a +5 V voltage via a bus 2 from a voltage regulator 3 fed through conductors 4 and 5 receiving in turn the positive + BVA and ground polarities, respectively, of the supply circuit of the automatic change-speed control means. The microcomputer is grounded via its Vss pin. A load resistor 6 is inserted in the conductor 4, and a Zener diode 7 is disposed in parallel between the conductors 4 and 5 for protecting the circuit against overloads. A pair of capacitors 8 and 9 are disposed upstream of the adjustable voltage regulator 3 for protecting the bus from statics. A capacitor 10 connects the conductor 5 to the bus 2 beyond the voltage regulator 3.

This regulated voltage is fed via another conductor 11 to a potentiometer 12 constituting a sensor for sensing the angular position of the throttle or accelerator pedal 13 operatively connected to the slider 14 of the potentiometer 12. The slider 14 is connected in turn via a conductor 15 and a line filter 16 to the ANO input of the microcomputer 1. A pair of parallel-connected capacitors 17, 18 are branched off the conductor 11 for assisting likewise in the protection against external statics. Thus, the potentiometer 12 will introduce the engine load parameter.

The vehicle speed parameter is introduced by means of a speed sensor 19 for example of the inductive or electromagnetic type which, in this example, cooperates with the parking locking wheel 20 of the vehicle and is followed by an electronic circuit 21 for converting the sensor signals into adequate pulses fed to the input TO of the microcomputer 1. The counter of this microcomputer converts, in turn, these pulses into digital data corresponding to the vehicle speed.

The voluntary control of the drive ratio changes is also contemplated through the medium of selectively operable electric switches such as a switch 22 (a switch actuated when the accelerator pedal is completely depressed, and usually referred to as the "kick down" switch), a switch 23 for engaging the first or low gear drive ratio, and another switch 24 for preventing the change to third or top gear, all these switches being connected to microcomputer inputs PO4, PO6 and PO7, respectively, with the interposition of low-pass filters comprising resistors 25, 26, and 27, and capacitors 28, 29 and 30 for eliminating possible strays or the inevitable rebound effect of the control switches concerned.

When the switches 22, 23, and 24 are open, inputs PO4, PO6 and PO7 are normally set in their high state by resistors 31, 32, and 33 connecting the switches 22, 23, and 24 to the +5 V bus or conductor 2. The voluntary control action is obtained by grounding the selected switch 22, or 23, or 24, so that the corresponding microcomputer input is set in its low state.

The microcomputer comprises a VTH input for setting the reference voltage of internal threshold comparators connected to the inputs PO4, PO6 and PO7; this reference voltage in set in this case to about 2.5 V by resistors 34 and 35 constituting a divider bridge, whereby the aforesaid internal comparators can eliminate strays developing in general near the ground on board a vehicle.

The microcomputer clock comprises an external quartz 36 and a parallel-connected resistor 37, coupled to inputs XTAL 1 and XTAL 2.

The closing of one of the switches 22, 23 or 24, or the utilization of the data delivered by the sensor 12 concerning the engine load and by the sensor 19 concerning the vehicle speed, are attended, with the assistance of an internal programming of the microcomputer operation, based notably on laws governing the drive ratio changes as a function of those parameters memorized in the microcomputer, by the fact that the two outputs P10 and P11 of the microcomputer, which are the outputs capable of delivering in the high state a current of 7 mA each, are set in their high or low logic states of which the combinations show (FIG. 2) corresponding selective energizations of the two solenoid valves EL1 and EL2 and the corresponding forward drive ratios.

The internal programming of the microcomputer operation and the memorizing laws are to some extent matters of choice for those skilled in the art; however, it should also be noted that an advantageous feature resulting from the use of a microcomputer is that eight selected laws can be memorized by means of three binary code inputs P20, P21, and P22 to which three selector circuits having contacts S1, S2, and S3 associated respectively with three resistors S'1, S'2, and S'3 are connected, for setting, as desired, the inputs P20, P21, and P22 in the high or low state. As already mentioned hereinabove, this arrangement greatly facilitates the adaptation of this electronic control system to various vehicles and also to the users' requirements.

The microcomputer outputs P10 and P11 are connected to inverters 38 and 39 having their outputs connected in turn via resistors 40 and 41 to the input of power interfaces consisting of semi-conductor amplifiers designated in general by the reference numerals 42 and 43, each comprising an input NPN transistor 44 or 45 having its emitter grounded and its collector connected to the +BVA terminal through a load resistor 46 or 47 and also to the base of a power PNP transistor 48 or 49 having its collector grounded and its emitter connected to one terminal of the winding of its solenoid valve EL1 or EL2. Each solenoid EL1 and EL2 has its other terminal connected to the +BVA terminal. The emitter of each power transistor 48 and 49 is also grounded via a by-pass capacitor 50 or 51.

The outputs of the amplifiers 42 and 43 are further connected to inputs P00 and P01 of the microcomputer 1 via resistor-type divider bridges 52 and 53 or 54 and 55, enabling adjustment of the voltage levels between the emitters of the power transistors 48 and 49 and the inputs P00 and P01. Diodes 56 and 57 are provided for protecting these inputs in case of overload at the amplifier outputs, notably when the energizing current of solenoid valves EL1 and EL2 is cut off. Between the divider bridges and the corresponding input P00 or P01 of the microcomputer 1 a low-pass filter comprising a resistor 58 and a capacitor 59 for the input P00 and a resistor 60 and capacitor 61 for the input P01 is provided in order to eliminate any strays appearing at the output of the amplifiers 42 and 43.

In order to supervise its proper operation, the microcomputer 1 is caused to generate in a known fashion, by means of a supervision sub-program utilizing its A/D converter and its internal memories, a square-wave signal appearing at its output P16, which is tested by an external supervision circuit connected to the output P16.

In this example the supervision circuit includes notably an inverter 62 connected to a ramp generator designated in general by the reference numeral 63 and comprising a capacitor 64 adapted to be charged and discharged periodically along the following lines:
- a charging line comprising a resistor 65 providing a slow charging of the capacitor 64 when the output of the inverter 62 is switched to its high state with the output P16 being in the low state;
- a fast discharge line parallel to the preceding one and comprising a resistor 66 in series with a diode 67 becoming conductive when the output of the inverter 62 is switched to its low state (with the output P16 in the high state).

The charging voltage of the capacitor 64 is fed to the inverting input of an operational amplifier 68 receiving at its non-inverting input the intermediate voltage from a divider bridge comprising resistors 69 and 70 interposed between the regulated +5 V bus and the ground.

The output of amplifier 68 is coupled via a feedback resistor 71 to the non-inverting input of the same amplifier, in order to promote the crossing of the compared voltages in the vicinity of the comparison point.

The output of the amplifier 68 is coupled to the input of the amplifiers 42 and 43 through a pair of diodes 72 and 73 conductive in the direction of the amplifier output and adapted according to its momentary state to shift towards this output the signal normally intended for amplification.

The output of the amplifier 68 is also coupled to the input T1 of the microcomputer 1 for a purpose to be explained presently, and also to a diagnosis outlet 74 to which are also connected conductors 75, 76 and 77 branched off the connections of the voluntary control switches 22, 23 and 24, respectively, with the microcomputer inputs P04, P06 and P07.

Also coupled to this diagnosis outlet 74 are three outputs P13, P14 and P15 of the microcomputer 1, which are intended for delivering to the diagnosis outlet 74, in combination with the signal at the input T1 of the microcomputer 1, coded data representative of failures or troubles detected in the electronic control system and displayed in the table of FIG. 3. These outputs P13, P14 and P15 are grounded via resistors 78, 79 and 80, respectively, and remain at their high level as long as no faulty operation or breakdown is sensed in connection therewith.

The input T1 and the three outputs P13, P14 and P15 are also connected to the four inputs of a NAND gate 83 having its output connected to a divider bridge comprising resistors 84 and 85. This bridge is coupled to the +BVA terminal to bias the base of a PNP transistor 86. The collector of the transistor 86, grounded through a resistor 87, is also connected to the base of another PNP transistor 88 having inserted in its emitter circuit an indicator light 89. The light 89 is incorporated in the instrument panel of the vehicle and is connected to the +BAT terminal of the storage battery of the vehicle.

The microcomputer 1 further comprises a re-initialization pin R connected to the bus 2 via a capacitor 90 and grounded through a diode 91 so as to provide a very fast response to any decrement in the regulated +5 V voltage and prevent any faulty operation of the microcomputer 1 by re-initializing the latter. This pin R then switches all the microcomputer outputs to their high level until the normal operative voltage is restored.

For the sake of safety both of the passengers and of the vehicle transmission, and as illustrated in the table of FIG. 2, when the solenoid valves EL1 and EL2 are not energized, it is the top drive ratio of the transmission that is engaged, thus avoiding any untimely or destructive changing down in case of failure either of the general current supply or of the automatic change speed mechanism. Moreover, if the voltage supply to the microcomputer happens to drop at pin R to a value below the voltage necessary for the proper operation of the microcomputer (in this case, below 4.5 Volts) the program is reset automatically, and the microcomputer is re-initialized, and simultaneously the outputs P10 and P11 are set to their high state. This high state corresponds to a non-conductive state of the amplifiers 42 and 43, considering the arrangement of the inverters 38 and 39, and therefore to a substantially zero current condition of the solenoids EL1 and EL2 (with due consideration for the fact that the passage of current then permitted towards the control inputs P00 and P01 can be regarded as negligible). Thus in this case of failure the vehicle transmission has its third or top gear engaged, if it is not already engaged, thus avoiding any possible untimely or destructive down change.

In addition to the corresponding stages of relationship existing between the microcomputer outputs P10 and P11, and those of amplifiers 42 and 43, and also to the voltage-current adaptation resulting from the above-described arrangement, this amplifier embodiment is characterized by the following advantageous features:

- it facilitates the cooling of the power transistors, since the two collectors which, as a rule, are electrically connected to the transistor radiators, can be disposed without any particular care on the same heat dissipator, which may contact the vehicle frame;
- it is unnecessary to provide any diode in parallel with the solenoid valves EL1 and EL2 for protecting the transistors 48 and 49, for when the solenoid energizing current is cut off, the feedback overvoltage across its terminals causes the base-to-emitter junction to become conductive and creates an emitter-to-base current through the resistor 46 or 47 connected to the + BVA terminal, so that the transistor will conduct until the feedback power is dissipated.

Moreover, the control circuits comprising divider bridges 52, 53 and 54, 55 connected to the microcomputer inputs P00 and P01 are effective for enabling this microcomputer to compare the logic coincidence between the output signal of P10 and P11 and the signal derived from the output of the amplifiers 42 and 43 towards the inputs P00 and P01, and the microcomputer is so programmed that in the absence of any logic coincidence it will cause the transmission to shift to the highest or third drive ratio to avoid any inconvenience likely to derive from a defect in the electrohydraulic interface (notably in the amplifier or solenoid valve), which is signaled by the resetting of the output P13.

If a fault occurs in the microcomputer operation and involves a wrong repetition or a complete absence of the aforesaid periodic signals at its output P16, the capacitor 64 will be changed beyond the reference voltage fed to the operational amplifier 68 by the divider bridge 69, 70, since the capacitor is no longer discharged by the regular occurrence of output signals at P16. In this case, when the aforesaid reference voltage is overstepped at the inverting input, the output of the amplifier 68 is shifted to its low condition, with the result that:

- the application of this low state to the inputs of the amplifiers 42 and 43 via the diodes 72 and 73 causes the diodes to become non-conductive and consequently the de-energization of the solenoid valves EL1 and EL2, so that the vehicle transmission will safely shift to its third or top gear;
- the application of this low state to the microcomputer input T1 is also attended by the internal operation of the microcomputer to set its outputs P10 and P11 in the state corresponding to the third or top drive ratio or gear.

With a view to improving safety, the cycle-meter type speed measurement is made during one revolution of the parking locking wheel 20, and the measure is effective only at a speed higher than 2.5 km.p.hr AT the end of each speed measurement, the microcomputer checks that the measured speed value is actually higher than 2.5 km.p.hr. If not, it stores in its memory the value of the previously measured speed which was actually taken into account in order to maintain the engaged gear ratio. With this arrangement it is possible, in case of failure or sudden drop of the frequency of the signal received from the speed sensor 19, to avoid an abrupt change-down through one or two gear ratios. Moreover, when the control is in the position corresponding to the intermediate or top gear ratio, or when voltage is supplied initially to the microcomputer, if a speed lower than 2.5 km.p.hr is detected, the output P15 is reset. Thus, during a first start and until the vehicle speed exceeds 2.5 km.p.hr (pilot lamp failure), or if the microcomputer detects a speed sensor failure in the intermediate or top gear, the output P15 will be reset.

On the other hand, the microcomputer 1 can test the proper operation of the load sensor. In case of failure, the electronic means controlling the automatic operation will keep operating with a defective engine load monitoring without any risk for the occupants of the vehicle or for the operation of the mechanical parts of the power-unit and transmission assembly. A VAref input receives the upper limit voltage, and a AVss input receives the lower limit voltage from te A/D converter integrated in the microcomputer. These voltage values are set to 5 V and 0 V, respectively. The voltage delivered through the slide contact 14 of the load potentiometer 12 evolves in operation from the non-depressed to the fully depressed position of the accelerator pedal 13 between 0.2 to 4.8 Volts. With the upper and lower limits of the converter set at 5 V and 0 V, respectively, a 0.2-Volt dead zone is available at both ends, so that it can be used for detecting a faulty operation of the potentiometer 12, the 0 to 0.2 V zone being used for detecting a break in the supply and potentiometer slider connections, while the 4.8 to 5 Volt zone is used for detecting a break in the potentiometer ground connection. The voltage delivered by the engine load sensor 12 is read in the average every millisecond for the electronic control requirements. During this reading, the microcomputer 1 checks that this voltage is within the 0.2 to 4.8 V range, and if not it resets its output P14, thus signalling that a failure occured in the engine load sensor 12.

The application of a single low state to the input of the NAND gate circuit 83 as a consequence of the occurrence of one of the above-mentioned faults involves the switching of its output to its high state, the non-conductive state of the transistor 86 and the conductive state of the transistor 88 having the indicator light 89 inserted in its emitter circuit. When this light 89 mounted in the instrument panel is on, the driver is warned that a failure took place in the control system and that he should see his repairer.

The coded data concerning a fault or trouble are delivered to the diagnosis outlet 74 shown in diagrammatic form in the table of FIG. 3, which relates to the detected conditions of the control means and also to the logic code resulting therefrom at the outputs T1, P13, P14 and P15, the x's of line in FIG. 3 meaning that the state of the outputs concerned is not taken into account for the fault displayed. This diagnosis outlet 74 is adapted to be connected to a corresponding seven-conductor plug 92 (FIG. 4) connected in turn to a control box 93 for the luminous display of the faults; this box 93 further comprises a pair of feed conductors to be connected to the +Bat and −Bat terminals of the storage battery of the vehicle to be tested. This box 93 also comprises means for decoding the coded data available at the diagnosis outlet 74, and eight luminous windows 94 which light up according to the decoded faults, i.e. the five faults of lines 2 to 6 of the table of FIG. 3, plus the three controls corresponding to the supervision of the switches 22, 23 and 24, respectively, which can be tested by means of voltage control instruments.

The purpose of the direct supply of current from the storage battery of the vehicle to the control box 93 is to take due account of a possible faulty supply through the +BVA line or the corresponding fuse.

It will also be seen that the indicator light 89 may act complementarily as a means for signalling an insufficient amount of lubricant in the automatic transmission by connecting a contact-type level detector 95 (FIG. 1) to the common point of the emitter of the transistor 88 and the indicator light 89, this detector 95 constituting the equivalent of a ground contact in case of insufficient oil level in the transmission, so as to energize the indicator light 89.

Of course, many modifications and changes may be brought by those skilled in the art to the specific form of embodiment described and illustrated herein by way of example, without departing from the basic principles of the invention.

What is claimed is:

1. A system for controlling the drive ratio changes in a motor vehicle automatic transmission having solenoid valves for changing the drive ratio, said valves being responsive to their solenoids and the solenoids being responsive to said system, the de-energized condition of said solenoid valves corresponding to the highest drive ratio, said vehicle having a source of energizing current, said system comprising:
   power amplifiers, each connected to the solenoid of a said solenoid valve for energizing it,
   a reset circuit,
   programmed microcomputer means connected to said power amplifiers and to said source for selectively governing the supply of energizing current to said solenoids through said power amplifiers, said microcomputer means also having resetting means connected to said reset circuit for re-initializing the program of said microcomputer means whenever the supply voltage drops to zero or whenever the microcomputer supply voltage drops below the value necessary for its proper operation, so that upon re-initialization of the program of said microcomputer, said solenoid valves are in their de-energized condition, thus assuring that the transmission will then be in its highest drive ratio when the program begins running.

2. The electronic control system of claim 1 having a current supply control circuit associated with each solenoid valve and connected at one end to the output of each power amplifier and the input to the corresponding solenoid and at its other end to one input of said microcomputer means, said microcomputer means having, connected to said input, means for comparing in said microcomputer the logic coincidence of the solenoid feed output signal with the signal from said current supply control circuit.

3. The electronic control system of claim 2, having supervision circuit means external to said microcomputer means and connected to a terminal thereof for supervising a periodic signal output representative of the proper operation of said microcomputer means, said supervision circuit means comprising voltage integration and comparison means for causing the output of said supervision circuit to assume one of two logic states according to the regularity or the non-regularity of said periodic signal, the output of said supervision circuit means being connected to a specific point of each solenoid valve current supply control circuit disposed between the corresponding microcomputer output and the corresponding power amplifier, whereby a logic faulty condition is attended by a specific state of said power amplifier which corresponds to the de-energized condition of its associated solenoid valve.

4. The electronic control system of claim 3, having a diagnosis outlet to which are connected said supervision circuit output and one microcomputer output responsive to the aforesaid coincidence comparison or comparisons.

5. The electronic control system of claim 4, having
   an alarm indicator light and
   an amplifier connected to said alarm indicator light and to said supervision circuit output and to the microcomputer output responsive to said coincidence comparison or comparisons, said amplifier having means to energize said alarm indicator light in response to a faulty logic state.

6. The electronic control system of claim 5, comprising
   a vehicle speed sensor connected to said microcomputer means,
   a comparator forming part of said microcomputer means, for controlling the operation of said vehicle speed sensor by comparing each speed measurement with a low starting-speed value, and for storing in a memory thereof any preceding value higher than said low starting speed value, for the purpose of maintaining the engaged drive ratio in case of failure of the speed sensor.

7. The electronic control system of claim 6, comprising
   a potentiometric-type load sensor for measuring the load of the vehicle engine and connected to said microcomputer means,
   a comparator forming part of said microcomputer means for comparing the potentiometric value picked up by said load sensor with a predetermined voltage range in which that value should lie, for the purpose of preventing failure.

8. The electronic control system of claim 7, wherein said microcomputer means comprises outputs for detecting failure in said speed and load sensors, said outputs being also connected to said diagnosis outlet.

9. The electronic control system of claim 8, having a common OR-type logic circuit or gate to the feed amplifier of said alarm indicator light to which are coupled said supervision circuit outputs, the microcomputer output responsive to said coincidence comparison or comparisons, and the speed and load sensor failure detection outputs.

10. The electronic control system of claim 8, comprising control means for voluntarily controlling the change, setting or prohibition of drive ratios, said control means having switches connected to corresponding inputs of said microcomputer and also to said diagnosis outlet, whereby their condition can be checked by testing their voltage.

11. The electronic control system of claim 8, wherein checking means is connected to said diagnosis outlet and comprises means for decoding the state of the various fault tracing outputs and for providing a selective luminous display of the possible faults or failures detected in the control system.

12. The electronic control system of claim 11, wherein said microcomputer comprises several inlets coupled to circuit means, said circuit means incorporating selector contacts for the binary coding of several laws governing the changes of drive ratios memorized in said microcomputer.

13. A system for controlling the drive ratio changes in a motor vehicle automatic transmission comprising
   solenoid valves for changing the drive ratio of said transmission,
   power amplifiers connected to and controlling said solenoid valves, the solenoids of said valves being responsive to said electronic control system, the de-energized condition of said solenoid valves corresponding to the highest drive ratio,
   a microcomputer connected to a supply voltage and having
     (a) a reset input pin,
     (b) a random access memory,
     (c) a read only memory, and
     (d) output pins connected separately to the windings of said solenoid valves through said power amplifiers, and
   an external reset circuit connected to said reset input pin for energizing that pin during a said resetting cycle starting at each come-up of said supply voltage,
   each said power amplifier having a reversing function, so that a high level on one of said output pins leads to a de-energized state of the corresponding solenoid valve,
   said microcomputer having logic means for causing said solenoid valves to effect said highest drive ratio upon starting a said resetting cycle,
   whereby after any drop below a minimum voltage value and the resultant imposition of said highest drive ratio to said automatic transmission, then when the supply voltage reaches again the minimum value necessary for normal operation of said microprocessor, said system keeps said highest ratio, due both to the normal resetting to highest level of said output pins during said resetting cycle, and the state of said logic means thereafter until the end of calculation of the appropriate said gear ratio.

* * * * *